Patented Oct. 22, 1940

2,218,617

UNITED STATES PATENT OFFICE 2,218,617

GEL RETARDING AGENT

John H. McKenzie, Chicago, Ill., assignor to Marbon Corporation, Chicago, Ill., a corporation of Delaware No Drawing. Application April 10, 1937,
Serial No. 136,075

9 Claims. (Cl. 260—735)

This invention relates to new compositions of matter, and more particularly to solutions of rubber hydrohalides containing a gel retarding agent.

The gelation of solutions of rubber hydrochloride in organic solvents apparently takes place in a manner similar to the gelation of solutions of gelatine in water. When the concentration of the rubber hydrochloride in the organic solvent is increased beyond the saturation point for a given temperature, as by reduction in the amount of solvent by evaporation, or by cooling of a hot solution to a temperature at which the rubber hydrochloride is no longer completely soluble, gelation takes place. Gelation also occurs by setting phenomenon which is not clearly understood. If solutions of rubber hydrochloride which are of concentration below the saturation point are allowed to stand without disturbance, the solution will gel after a greater or less time interval, depending on the type of rubber hydrochloride and the type of solvent. Solutions which are neutral or contain an excess of antacid to neutralize acidity will gel quicker than acid solutions; a rather unfortunate occurrence since for most commercial purposes neutral as well as non-gelling solutions are required. Furthermore, solutions of rubber hydrochloride in carbon tetrachloride, toluol, xylol, and higher homologues of benzol will gel sooner than tetrachlorethane, ethylene dichloride and benzol solutions of rubber hydrochloride; and rubber hydrochloride solutions containing high proportions of resins such as are used for lacquer and adhesive purposes willl gel in general sooner than the pure solutions of rubber hydrochloride.

The gelation of rubber hydrohalide solutions may be retarded in various ways. A partially saturated rubber hydrohalide gels less readily than a substantially saturated product but the lack of saturation is objectionable because of poorer oil resistance, tackiness and other detrimental qualities. Heating rubber hydrohalide solutions and maintaining the solutions at an elevated temperature for several minutes will reduce the viscosity of the solutions and slightly extend the time of gelation, but the effect is not as good as attained by the addition of certain materials, herein called gel retarding agents, to the solutions, and is, therefore, ordinarily used, if at all, as a supplement to the use of gel retarding agents.

I have found that the ketones which are non-solvents for rubber hydrochloride are in general good gel retarding agents, for solutions of rubber hydrochlorides when the volume per cent of ketone in the solvent mixture is between approximately 5% to 30%, and preferably 20%. As the percentage of ketone is increased beyond 30% by volume, the ketone does not retard gelation, but on the contrary appears to promote it.

However, in the case of ketones which are themselves good solvents for the rubber hydrochloride, the outer limits of ketone concentration may be considerably extended, and indeed in the case of ketones which are better solvents for the rubber hydrochloride than the particular other solvent present the gelation of the solution will be retarded when the ketone is present in any substantial amount.

In addition to the ketones I have found that methyl alcohol is a gel retarding agent for rubber hydrochloride solutions when used in proportions of approximately 10 parts by volume of methyl alcohol to 90 parts by volume of solvent.

The exact mechanism of the action of gel retarding agents in solutions of rubber hydrochloride is not definitely known. The explanation does not lie wholly in the solvent action of the agent because some of the gel retarding agents are nonsolvents, and some are solvents. Moreover, although many materials which retard gelation also reduce the viscosity of the rubber hydrochloride solutions, there are a great many materials which will reduce viscosity which are not gel retarders and some materials which do not reduce viscosity which are gel retarders. It would appear that there is some relation between the chemical structure of the gel retarders and their gel retarding ability. This follows from the fact that practically all ketones with a few outlying exceptions are gel retarders. However, why methyl alcohol in low proportion should act as a gel retarder is not clearly understood. Neither is it known why ketones such as cyclohexanone, acetophenone, and benzophenone should be gel retarders while methyl cyclohexanone, acridon, and Michler's ketone are not.

My invention may be more clearly understood by referring to results of tests as shown in the table.

The table gives the results of tests on the gelation retarding effect of various compounds in rubber hydrochloride solutions. The results are exemplary for all types of rubber hydrochloride solutions. The actual tests, however, were carried out with neutral solutions of milled stabilized amorphous saturated rubber hydrochlorides of approximately 30% chlorine content, the proportion of rubber hydrochloride to solvent mixture being 15 grams of rubber hydrochloride to 100 c. c. of solvent mixture.

However, it is not intended to so restrict my invention since my gel retarders are also useful in solutions of amorphous or crystalline rubber hydro chlorides in benzol, ethylene dichloride, tetrachlorethane, and like solvents.

Table

| No. | Solvent | Diluent | Percent by volume Solvent | Percent by volume Diluent | Remarks |
|---|---|---|---|---|---|
| 61 | Ethylene dichloride | | 100 | 0 | No gel in 60 days. |
| 58 | Benzol | | 100 | 0 | Do. |
| 51 | Xylol | | 100 | 0 | Gel in 4 days. |
| 44 | do | Methyl ethyl ketone | 80 | 20 | Gel in 30 days. |
| 45 | do | Mesityl oxide | 80 | 20 | No gel in 60 days. |
| 46 | do | Cyclo hexanone | 80 | 20 | Do. |
| 47 | do | Acetone | 80 | 20 | Do. |
| 49 | do | Methyl isobutyl ketone | 80 | 20 | Gel in 30 days. |
| 50 | do | Methyl propyl ketone | 80 | 20 | No gel in 60 days. |
| 66 | do | Cyclohexanone | 50 | 50 | Do. |
| 67 | do | do | 60 | 40 | Do. |
| 46 | do | do | 80 | 20 | Do. |
| 68 | do | Acetophenone | 80 | 20 | Do. |
| 69 | do | Benzophenone | 80 | 20 | Do. |
| 70 | do | p-Hydroxy benzophenone | 80 | 20 | Gel in 24 days. |
| 71 | do | o-Hydroxy aceto-phenone | 80 | 20 | No gel in 60 days. |
| 80 | do | Methyl alcohol | 90 | 10 | Gel in 22 days. |
| 81 | do | do | 95 | 5 | Gel in 9 days. |
| 58 | CCl₄ | | 100 | | Gel in 11 days. |
| 59 | do | Acetone | 80 | 20 | No gel in 60 days. |
| 60 | do | Cyclo hexanone | 80 | 20 | Do. |

My invention is applicable to the production of liquid compositions of all types, including adhesives and lacquers. Resins, including gums and waxes may be used in such compositions, including rosin, copal, glyceryl abietate, ethyl abietate, chlorinated diphenyls, hard and soft polycumarones, chlorinated naphthalenes, paraffin wax. With such solutions, antacid stabilizers such as magnesium oxide, sodium carbonate, calcium oxide, hexamethylene tetramine, litharge, are advantageously used.

The following example will illustrate an application of my invention in the field of adhesives:

Parts by weight
Amorphous rubber hydrochloride (29.8% chlorine) _____ 100
Acetone _____ 73.5
Toluol _____ 326.5
Ethyl abietate _____ 200
Magnesium oxide _____ 10
Hexamethylene tetramine _____ 1

The following example will illustrate an application of my invention in the field of lacquers:

Parts by weight
Amorphous rubber hydrochloride (29.8% chlorine) _____ 100
Methyl ethyl ketone _____ 105
Xylol _____ 465
Hexamethylene tetramine _____ 1
Magnesium oxide _____ 10
Ester gum _____ 50
Titanium dioxide pigment _____ 30

Inasmuch as the description and examples are largely illustrative in character, any variation or modification thereof which conforms to the spirit of the invention is intended to be included within the scope of the claims.

It is to be understood that the value of my gel retarding agents varies with the type of rubber hydrochloride and the type of solvent. Solutions of amorphous rubber hydrochloride in benzol or ethylene dichloride, and particularly if such solutions are dilute, gel if at all, only after a period of years, so that the use of my compounds with such solutions as gel retarders per se is of lesser value than with solutions which gel in a few hours. The great value of my invention is with concentrated solutions of amorphous substantially saturated rubber hydrochloride in toluol and xylol.

It is also to be understood that although the principal value of my ketones and methyl alcohol is as gel retarding agents, many of these materials are useful for other purposes. The non-solvent ketones and methyl alcohol will materially reduce the viscosity of rubber hydrochloride solutions; and are particularly effective when used in the concentrations of from 5% to 30% preferably 20%, used to retard gelation.

I claim:

1. A composition comprising a substantially saturated amorphous rubber hydrochloride, a benzol type solvent therefor, and a nonsolvent ketone gel retarding agent in the proportion of approximately 5 to 30 parts by volume of ketone per 95 to 70 parts by volume of solvent.

2. A composition comprising a substantially saturated amorphous rubber hydrochloride, a solvent from the group consisting of toluol, xylol, and carbon tetrachloride; and acetone in the proportion of approximately 20 parts by volume of acetone to 80 parts by volume of solvent.

3. A composition comprising a solution of a substantially saturated amorphous rubber hydrochloride in a mixture of toluol and acetone, the proportion of acetone to toluol being approximately 20 to 80 by volume.

4. As a new product, a solution of rubber hydrochloride which by itself at normal room temperature will gel by a setting phenomenon, having incorporated therein a gel retarding agent, such agent being selected from the group consisting of non-solvent ketones, solvent ketones, and methyl alcohol, said non-solvent ketones and methyl alcohol being present in not more than approximately 30% by volume of the solvent mixture of rubber hydrochloride solvent and non-solvent gel retarding agent.

5. As a new product, a solution of a rubber hydrochloride which by itself at normal room temperature will gel by a setting phenomenon, containing a ketone which is not a solvent for rubber hydrochloride as a gel retarding agent, said ketone being present in not more than approximately 30% by volume of the solvent mixture of rubber hydrochloride solvent and non-solvent ketone.

6. As a new product, a solution of a rubber hydrochloride which by itself at normal room temperature will gel by a setting phenomenon, containing methyl ethyl ketone as a gel retarding agent, said methyl ethyl ketone being present in not more than approximately 30% by volume of the solvent mixture of rubber hydrochloride solvent and methyl ethyl ketone.

7. As a new product, a solution of a rubber hydrochloride which by itself at normal room temperature will gel by a setting phenomenon, containing acetone as a gel retarding agent, said acetone being present in not more than 30% by volume of the solvent mixture of rubber hydrochloride solvent and acetone.

8. As a new product, a solution of a rubber hydrochloride which by itself at normal room temperature will gel by a setting phenomenon, containing cyclohexanone as a gel retarding agent, said cyclohexanone being present in not more than approximately 30% by volume of the solvent mixture of rubber hydrochloride solvent and cyclohexanone.

9. In a solution of rubber hydrochloride which by itself will gel at normal room temperature by a setting phenomenon, a ketone which is not a solvent for said rubber hydrochloride present in the solution of rubber hydrochloride in the proportion of approximately 5 to 30 parts by volume of ketone per 95 to 70 parts by volume of solvent for the rubber hydrochloride.

JOHN H. McKENZIE.